United States Patent
Deleus et al.

(10) Patent No.: US 8,532,585 B2
(45) Date of Patent: Sep. 10, 2013

(54) ELECTRONIC DEVICE WITH ROTARY KNOB MULTI-FUNCTIONAL CONTROL

(75) Inventors: Willem Deleus, Bortmeerkbeek (BE); Robert Jastram, Asheville, NC (US); James Teel, Lynchburg, VA (US)

(73) Assignee: Harris Corporation, Melbourne, FL (US)

( * ) Notice: Subject to any disclaimer, the term of this patent is extended or adjusted under 35 U.S.C. 154(b) by 283 days.

(21) Appl. No.: 12/777,568

(22) Filed: May 11, 2010

(65) Prior Publication Data

US 2011/0281533 A1   Nov. 17, 2011

(51) Int. Cl.
*H04B 1/38* (2006.01)

(52) U.S. Cl.
USPC ......... 455/90.2; 455/90.3; 345/160; 345/161; 345/162; 345/163; 345/164

(58) Field of Classification Search
USPC ................................................ 345/163, 173
See application file for complete search history.

(56) References Cited

U.S. PATENT DOCUMENTS

| | | | |
|---|---|---|---|
| 4,131,033 A | 12/1978 | Wright et al. | |
| 5,270,689 A | 12/1993 | Hermann | |
| 5,662,747 A * | 9/1997 | Kawana et al. | 148/320 |
| 5,663,747 A * | 9/1997 | Shulman | 345/161 |
| 6,097,964 A | 8/2000 | Nuovo et al. | |
| 2002/0098874 A1 | 7/2002 | Zirul et al. | |
| 2007/0155415 A1 | 7/2007 | Sheehy et al. | |
| 2007/0270179 A1 | 11/2007 | Lee et al. | |
| 2008/0078661 A1 | 4/2008 | Matsumoto et al. | |
| 2008/0088602 A1 * | 4/2008 | Hotelling | 345/173 |
| 2009/0033552 A1 * | 2/2009 | Kirmuss et al. | 342/357.08 |
| 2010/0291883 A1 | 11/2010 | Lim et al. | |
| 2011/0201379 A1 | 8/2011 | Jastram et al. | |
| 2011/0281533 A1 | 11/2011 | Deleus et al. | |

FOREIGN PATENT DOCUMENTS

| | | |
|---|---|---|
| DE | 19906386 A1 | 8/2000 |
| EP | 1 569 073 A2 | 8/2005 |
| WO | 2010020986 A2 | 2/2010 |

OTHER PUBLICATIONS

Jastram, R., et al. U.S. Appl. No. 12/706,843, filed Feb. 17, 2010, entitled "Communication Device With a Multi-Functional Control".

(Continued)

*Primary Examiner* — Fayyaz Alam
*Assistant Examiner* — Mohammed Rachedine
(74) *Attorney, Agent, or Firm* — Fox Rothschild, LLP; Robert J. Sacco

(57) ABSTRACT

Control of multiple functions of an electronic device is provided by using a single control element (102) including a switch body (312) adjustable between multiple switch positions, a primary actuator (302) with lateral (302b) and distal surface (302a) portions extending from the switch body and configured for adjusting the switch body between the switch positions, and a pressure sensor (314) operable via an activation force at the lateral surfaces of the primary actuator. A first function can be controlled responsive to motion of the primary actuator during an activation of the pressure sensor. Additionally, a second function can be controlled responsive to the motion of the primary actuator of the control element exclusive of the activation of the pressure sensor. Further, a third function can be controlled in responsive to activation of the pressure sensor for at least a first period of time exclusive of motion of the primary actuator.

26 Claims, 6 Drawing Sheets

(56) References Cited

OTHER PUBLICATIONS

Information about Related Patents and Patents Applications, see section 6 of the accompanying Information Disclosure Statement Letter, which concerns Related Patents and Patent Applications, U.S. Appl. No. 12/706,846, Feb. 17, 2010.

International Search Report mailed Aug. 10, 2011, Application Serial No. PCT/US2011/035098, in the name of Harris Corporation.

* cited by examiner

ELECTRONIC DEVICE WITH ROTARY KNOB MULTI-FUNCTIONAL CONTROL

BACKGROUND OF THE INVENTION

1. Statement of the Technical Field

The inventive arrangements relate to communication systems, and more particularly to systems and methods for controlling a radio transceiver using a multi-functional control element.

2. Description of the Related Art

There are various types of conventional communication networks. Such communication networks include a Land Mobile Radio (LMR) network, a Wideband Code Division Multiple Access (WCDMA) based network, a Code Division Multiple Access (CDMA) based network, a Wireless Local Area Network (WLAN), an Enhanced Data rates for GSM Evolution (EDGE) based network and a Long Term Evolution (LTE) based network. Each of these communication networks generally includes a plurality of communication devices and network equipment configured to facilitate communications between the communication devices. Each communication network often provides a group call service to service users. A group call service is generally a service by which a service user (e.g., first responder) is able to simultaneously talk to other service users (e.g., other first responders) associated with a particular talk group or social media profile. The group call service is generally implemented by a Push-To-Talk (PTT) group call service. Thus, the PTT group call service is an instant service by which the PTT service user is able to immediately talk to other PTT service users of a particular talk group or social media profile by pushing a PTT button of a communication device Some types of these communication devices include land mobile radio (LMR) devices. Each of the devices typically includes a plurality of rotary knobs and a PTT button for controlling a radio transceiver thereof. In many configurations, these rotary knobs are disposed on top panels of the radios. Generally, a first one of the rotary knobs is provided for selecting an individual or a talk group to which a PTT call is to be made and second one of the rotary knobs is provided for controlling an audio volume of a radio. In addition to these knobs, a PTT button is typically disposed on a side panel of the radio. Consequently, a user of the radio is generally unable to use one finger alone for controlling the radio receiver of the radio. Further, two hands are typically required to hold the radio and change functional settings of the radio through the plurality of rotary knobs.

SUMMARY OF THE INVENTION

Embodiments of the invention concern systems and methods for controlling an electronic device. In a first embodiment of the invention, a method is provided for controlling multiple functions of an electronic device using a single control element that includes a switch body adjustable between plurality of switch positions, a primary actuator extending from the switch body with lateral and distal surface portions and configured for adjusting the switch body between the plurality of switch positions, and a pressure sensor operable via an activation force at one or more portions of the lateral surfaces of said primary actuator. The method includes the step of controlling a first function of the electronic device in response to motion of the primary actuator during an activation of the pressure sensor. The method further includes the step of controlling a second function of the electronic device in response to the motion of the primary actuator of the control element exclusive of the activation of the pressure sensor. The method also includes the step of controlling a third function of the electronic device in response to the activation of the pressure sensor for at least a first period of time exclusive of motion of the primary actuator.

In a second embodiment of the invention, an electronic device includes a control element and at least one controller communicatively coupled to the control element. The control element includes a switch body adjustable between a plurality of switch positions, a primary actuator with lateral and distal surface portions extending from the switch body and configured for adjusting the switch body between the plurality of switch positions, and a pressure sensor operable via an activation force at one or more portions of the lateral surfaces of the primary actuator. In the electronic device, the controller is configured to: (a) control a first function of the electronic device in response to motion of the primary actuator during an activation of the pressure sensor, (b) control a second function of the electronic device in response to the motion of a primary actuator of the control element exclusive of the activation of the pressure sensor, and (c) control a third function of the electronic device in response to the activation of the pressure sensor for at least a first period of time exclusive of motion of the primary actuator.

In a third embodiment of the invention, a radio transceiver is provided. The radio transceiver includes one or more radio frequency circuits and a rotary control element. The rotary control element includes a rotary switch body movable between a plurality of switch positions, a primary actuator with lateral and distal surface portions extending from the switch body and configured for moving the switch body between the plurality of switch positions, and a pressure sensor accessible at said lateral surfaces of the primary actuator. The radio transceiver also includes at least one controller communicatively coupled to the control element and the radio frequency circuits, where the controller is configured to: (a) control a first function of the radio transceiver in response to motion of the primary actuator during an activation of the pressure sensor, (b) control a second function of the radio transceiver in response to the motion of a primary actuator of the control element exclusive of the activation of the pressure sensor, and (e) activate a Push to Talk (PTT) function of the radio transceiver in response to the activation of the pressure sensor for at least a first period of time exclusive of motion of the primary actuator.

BRIEF DESCRIPTION OF THE DRAWINGS

Embodiments will be described with reference to the following drawing figures, in which like numerals represent like items throughout the figures, and in which.

DETAILED DESCRIPTION

The invention is described with reference to the attached figures. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operation are not shown in detail to avoid obscuring the invention. The invention is not limited by the illustrated ordering of acts or events, as some acts may occur in different orders and/or concurrently with other acts or events. Furthermore, not all illustrated acts or events are required to implement a methodology in accordance with the invention.

Figure 1:
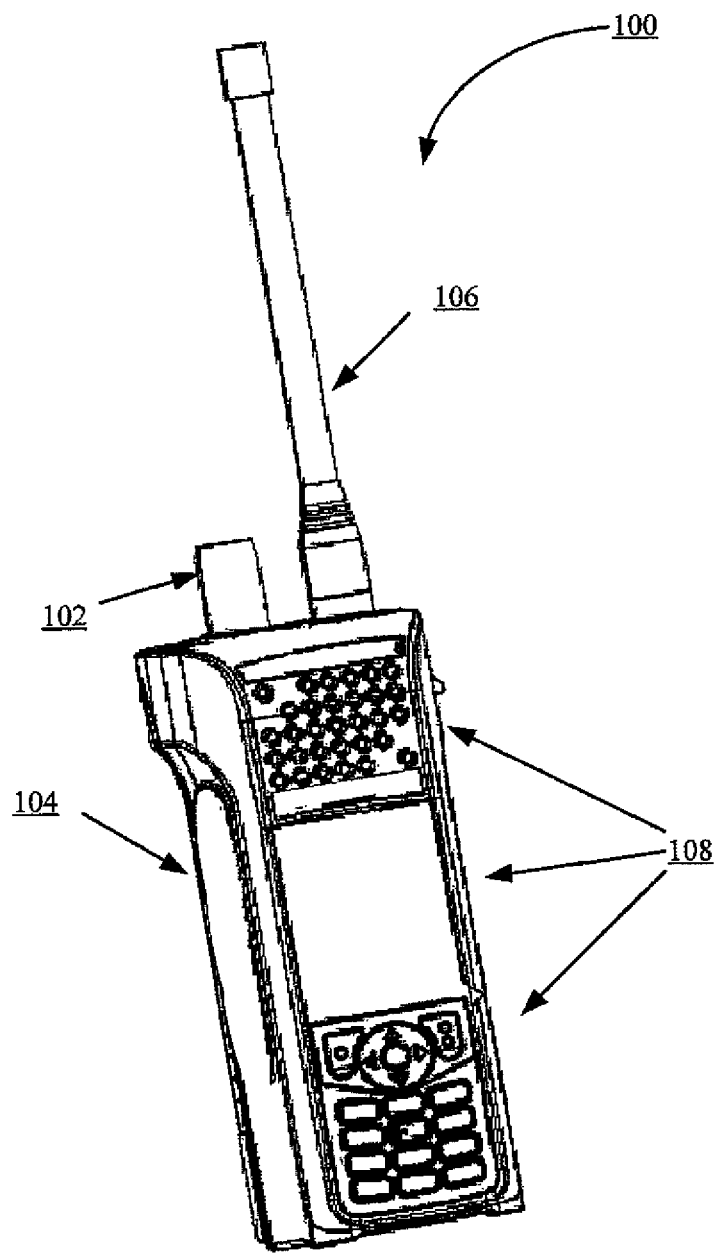
FIG. 1 is a schematic illustration of an exemplary communication device in accordance with an embodiment of the invention.

Referring now to FIG. 1, there is provided an illustration of an exemplary communication device 100 in accordance with the various embodiments of the invention. Although the communication device 100 is shown in FIG. 1 to be a portable LMR device, the various embodiments of the invention are not limited in this regard. For example, the communication device 100 can alternatively include, but is not limited to, a mobile phone, a cellular phone, a personal digital assistant, a global positioning device, a personal computer, a television, a vehicular communication device or other communication device. In each of these embodiments, the communication device 100 generally includes a housing 104, an antenna 106 and internal circuitry (not shown in FIG. 1). The communication device 100 also includes a control element 102 and other user interface components 108.

In some embodiments of the invention, the communication device 100 shown in FIG. 1 is generally configured to facilitate the provision of data communication services, individual call services or group call services to a service user. A data communication service is generally a service by which a service user is able to send and/or receive data messages. An individual call service is generally a service by which a service user is able to talk with one other service user. The group call service is a service by which a service user is able to talk to one or more service users associated with a particular talk group or social media profile. The group call service can be implemented by a PTT group call service. The PTT group call service is an instant service by which the PTT service user is able to immediately talk to other PTT service users of a particular talk group or social media profile by actuating the control element 102 of the communication device 100.

The communication device 100 is configured to operate in a LMR based communication system, a Global Positioning System (GPS), a cellular based communication system or other wireless communication system. The cellular based system can include, but is not limited to, a second generation (2G) compatible wireless telephone system, a third generation (3G) compatible wireless telephone system, a fourth generation (4G) compatible wireless telephone system, and/or any future wireless telephone systems. In such embodiments, the communication device 100 can support present and/or future data services available via 2G, 3G, 4G, or other wireless telephone systems. However, the various embodiments of the invention are not limited in this regard.

The communication device 100 can employ a single communication protocol or multiple communication protocols. For example, if the communication device 100 is an LMR device, then it can employ one or more of the following communication protocols: a Terrestrial Trunked Radio (TETRA) transport protocol; a P25 transport protocol; an OPENSKY® protocol; and an Enhanced Digital Access Communication System (EDACS) protocol. If the communication device 100 is a cellular phone, then it can employ one or more of the following communication protocols: a Wideband Code Division Multiple Access (WCDMA) based protocol; a Code Division Multiple Access (CDMA) based protocol; a Wireless Local Area Network (WLAN) based protocol; an Enhanced Data rates for GSM Evolution (EDGE) network based protocol; and a Long Term Evolution (LTE) network based protocol. However, the various embodiments of the invention are not limited in this regard.

Figure 2:
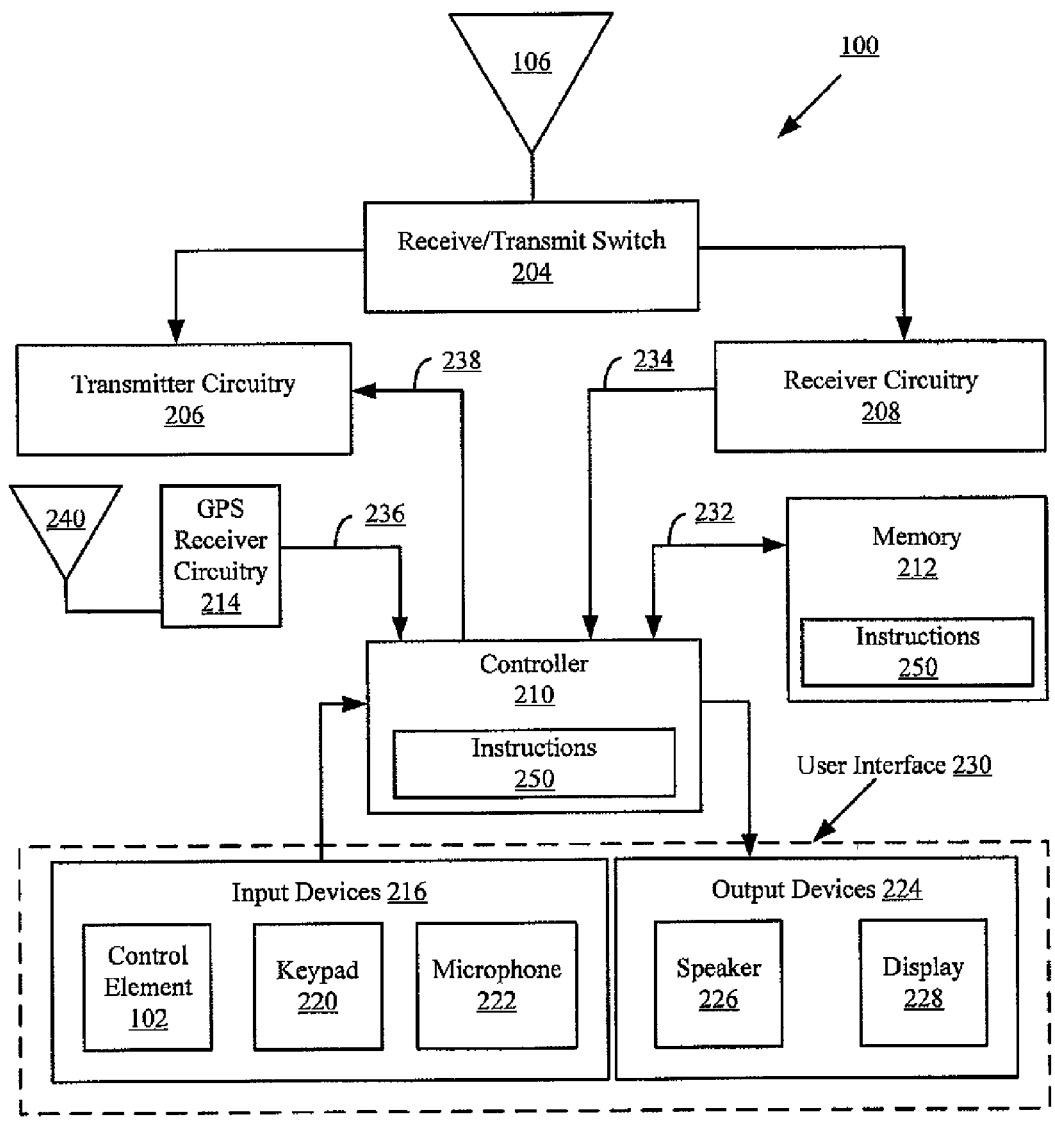
FIG. 2 is a more detailed block diagram of the exemplary communication device shown in FIG. 1.

A more detailed block diagram of the communication device 100 is provided in FIG. 2. Notably, the communication device 100 may include more or less components than those shown in FIG. 2. However, the components shown are sufficient to disclose an illustrative embodiment of the invention.

As shown in FIG. 2, the communication device 100 comprises an antenna 106 for receiving and transmitting Radio Frequency (RF) signals. A receive/transmit (Rx/Tx) switch 204 selectively couples the antenna 106 to the transmitter circuitry 206 and receiver circuitry 208. The receiver circuitry 208 demodulates and decodes the RF signals received from a network (not shown in FIG. 2) to derive information therefrom. The receiver circuitry 208 is coupled to a controller 210 via an electrical connection 234. The receiver circuitry 208 provides the decoded RF signal information to the controller 210. The controller 210 uses the decoded RF signal information in accordance with the function(s) of the communication device 100.

The controller 210 also provides information to the transmitter circuitry 206 for encoding and modulating information into RF signals. Accordingly, the controller 210 is coupled to the transmitter circuitry 206 via an electrical connection 238. The transmitter circuitry 206 communicates the RF signals to the antenna 106 for transmission to an external device (e.g., network equipment not shown in FIG. 2).

An antenna 240 is coupled to Global Positioning System (GPS) receiver circuitry 214 for receiving GPS signals. The GPS receiver circuitry 214 demodulates and decodes the GPS signals to extract GPS location information therefrom. The GPS location information indicates the location of the communication device 100. The GPS receiver circuitry 214 provides the decoded GPS location information to the controller 210. As such, the GPS receiver circuitry 214 is coupled to the controller 210 via an electrical connection 236. The controller 210 uses the decoded GPS location information in accordance with the function(s) of the communication device 100.

The controller 210 stores the decoded RF signal information and the decoded GPS location information in a memory 212 of the communication device 100. Accordingly, the memory 212 is connected to and accessible by the controller 210 through an electrical connection 232. The memory 212 can include volatile and/or non-volatile memory elements. For example, a volatile memory element for memory 212 can include, but is not limited to, Random Access Memory (RAM) elements, such as a Dynamic Random Access Memory (DRAM) and Static Random Access Memory (SRAM) elements. A non-volatile memory element for memory 212 can include Read-Only Memory (ROM) elements, such as programmable read-only memory (PROM), and flash memory elements.

As shown in FIG. 2, one or more sets of instructions 250 are stored in the memory 212. The instructions 250 can also reside, completely or at least partially, within the controller 210 during execution thereof by the communication device 100. In this regard, the memory 212 and the controller 210 can constitute machine-readable media. The term "machine-readable media", as used here, refers to a single medium or multiple media that store the one or more sets of instructions 250. The term "machine-readable media", as used here, also refers to any non-transitive medium that is capable of storing, encoding or carrying the set of instructions 250 for execution by the communication device 100 and that cause the communication device 100 to perform one or more of the methodologies of the present disclosure.

The controller 210 is also connected to a user interface 230. The user interface 230 is comprised of input devices 216, output devices 224, and software routines (not shown in FIG. 2) configured to allow a user to interact with and control software applications (not shown in FIG. 2) installed on the computing device 100. Such input and output devices respectively include, but are not limited to, a display 228, a speaker 226, a keypad 220, a directional pad (not shown in FIG. 2), a directional knob (not shown in FIG. 2), a microphone 222 and a control element (e.g., a PTT button or switch) 102. The display 228 may be designed to accept touch screen inputs.

The user interface 230 is operative to facilitate a user-software interaction for launching group call applications (not shown in FIG. 2), PTT call applications (not shown in FIG. 2), social media applications, interne applications and other types of applications installed on the computing device 100. The group call and PTT call applications (not shown in FIG. 2) are operative to provide a group call service to a user of the communication device 100.

According to one embodiment of the invention, the control element 102 is configured to function as a PTT group selection switch. As such, the control element 102 provides a user with a switch element adjustable between various positions associated with different groups and/or individuals. Thus, a PTT call to a specific group or individual can be initiated by the user by first adjusting the position of the control element 102 to an appropriate position. Thereafter, a call application can be initiated. The call application facilitates the provision of a call service to a user of the communication device 100. As such, the call application is operative to perform communication operations. The communication operations can include, but are not limited to, message generation operations, message communication operations, voice packet recording operations, voice packet queuing operations and voice packet communication operations.

In the various embodiments of the invention, the control element 102 is also configured for controlling other functions of communications device 100 other than PTT group selection functions. As such, the control element 102 has an additional selection means that can be used for selecting and/or controlling other functions for the control element 102. In the various embodiments of the invention, the additional selection means for the control element 102 is implemented as a pressure sensing means on the surface of the control element 102. Thus, different functions of the communication device 100 are selected via the control element 102 in response to activation of the pressure sensing means (e.g., via depression of one or more secondary switches or buttons on the surface of the control element 102) for a pre-defined period of time (e.g., less than or greater than two seconds). Functions can include, but is not limited to, an audio volume function, a channel selection function, a mute function, a brightness selection function, an "on/off" function, a play function, a rewind function, a fast forward function, a pause function, a channel recall function, a camera function, a talk group selection function, a media profile selection function, an emergency call function, a map selection function, a priority selection function and a user selection function. However, embodiments of the invention are not limited in this regard and any other functions can also be selected.

As described above, the control element 102 is configured as a switch element having a plurality of positions for controlling particular functions of the communication device 100. In the various embodiments of the invention, the switch element can include switching devices where the plurality of positions are selected via a mechanical actuator operating based on linear motion (vertical or horizontal), rotary motion, pivoting motion, or any combination thereof. For example, a particular function of the communication device 100 is controlled by the control element 102 in response to the rotation of portions of the control element 102 about a central axis thereof or along a motion axis or path. The functions controlled can include, but are not limited to, an audio volume function, a channel selection function, a mute function, a brightness selection function, an "on/off" function, a play function, a rewind function, a fast forward function, a pause function, a channel recall function, a camera function, a talk group selection function, an emergency call function, a map selection function, a priority selection function, a user interface selection function and a media profile selection function.

Although the various embodiments of the invention will generally be described with respect to mechanical switch elements, the various embodiments of the invention are not limited in this regard. In other embodiments of the invention, the control element 102 can be implemented via electronic switch elements. For example, touch screen or touchpad technologies can be configured to implement virtual control elements with motion and pressure sensing means in accordance with the various embodiments of the invention.

Figure 3:
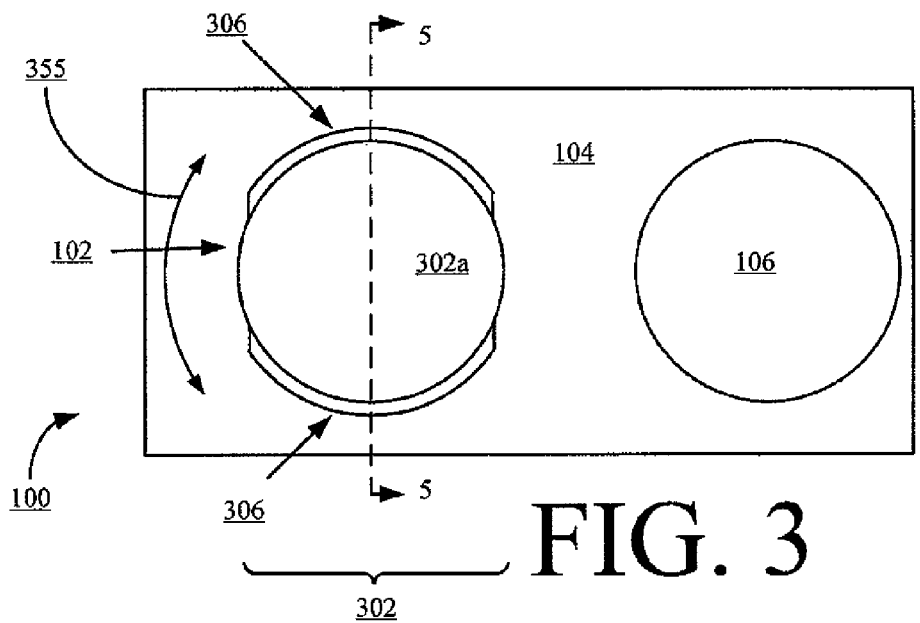
FIG. 3 is a top view of a portion of the communications device in FIG. 1, including a first exemplary embodiment of a control element in accordance with an embodiment of the invention.
Figure 4:
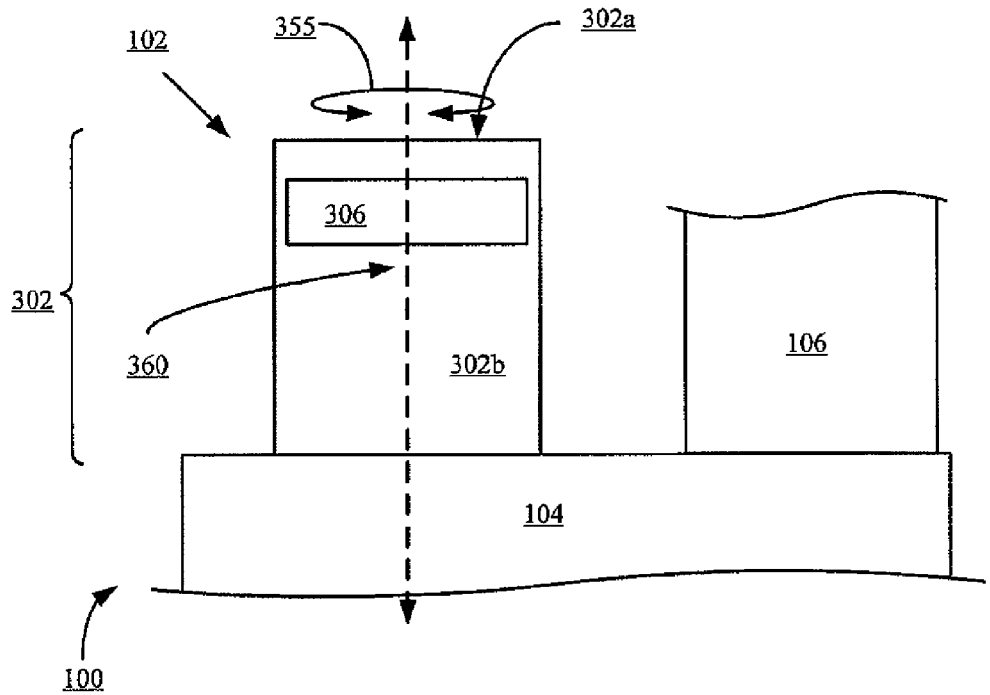
FIG. 4 is a front view of a portion of the communications device in FIG. 1, including a first exemplary embodiment of a control element in accordance with an embodiment of the invention.
Figure 5:
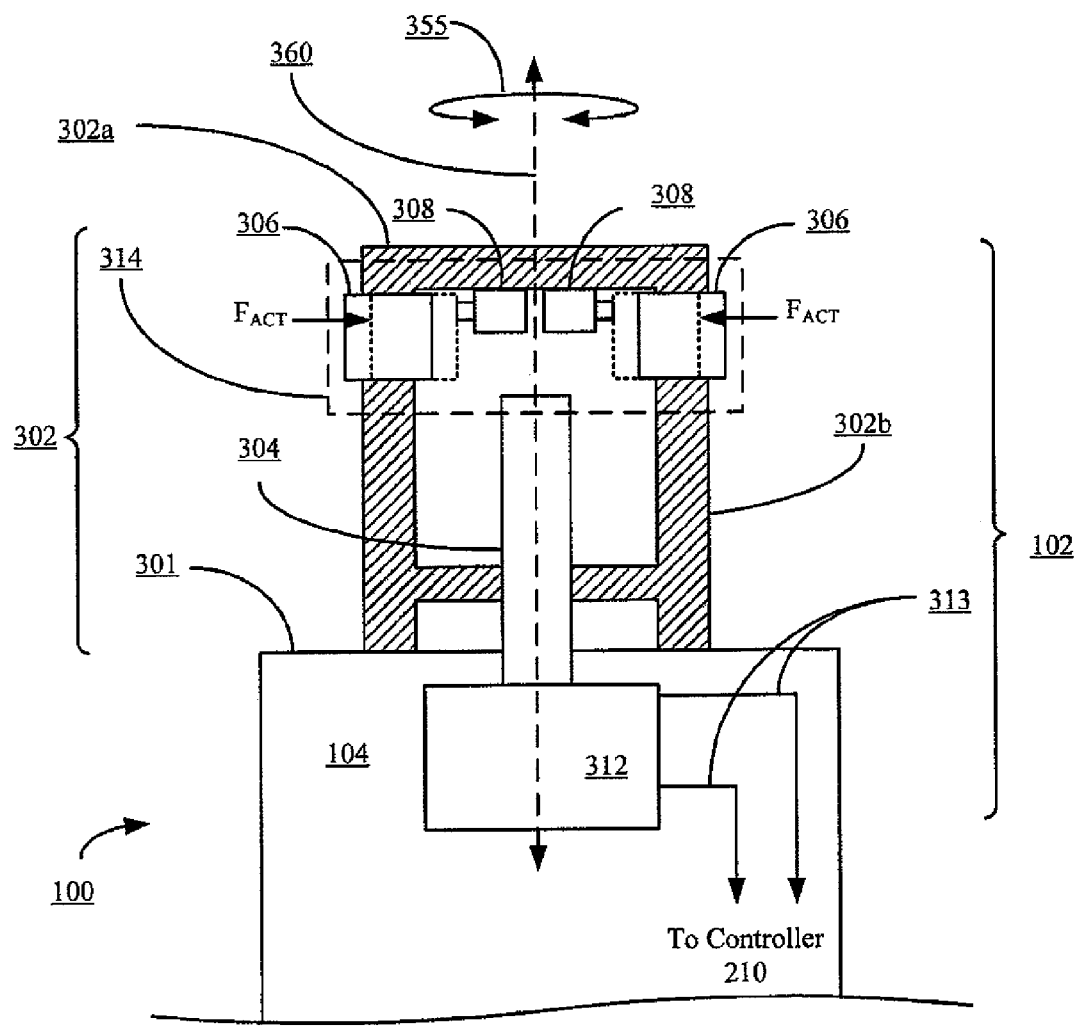
FIG. 5 is cross-section view of a portion of the communications device in FIG. 1 along section line 5-5.

Referring now to FIGS. 3-5, there are provided various illustrations of portions of communications device 100 including a first exemplary embodiment of control element 102 in accordance with an embodiment of the invention. FIG. 3 is a top view of communications device 100 including the first exemplary embodiment of control element 102. FIG. 4 is a front view of a portion of communications device 100 including the first exemplary embodiment of control element 102. FIG. 5 is cross-section view of a portion of communications device 100, including the first exemplary embodiment of control element 102, along section line 5-5 in FIG. 3.

In the exemplary embodiment illustrated in FIGS. 3-5, the control element 102 illustrated therein is based on rotary motion (i.e., the control element 102 provides for rotary motion 355 about axis 360). However, it should be understood that there are numerous ways of implementing the control element 102 in FIGS. 3-5. As such, the invention is not limited to the specific arrangement shown in FIGS. 3-5.

As shown in FIGS. 3-5, the control element 102 includes a primary actuator 302, an actuating member 304 (e.g., a shaft or lever), secondary actuators 306, switches 308, and a switch body 312 having a plurality of switch positions. Switch body 312 can be used to generate signals 313 for controller 210. Control element 102 can also include wiring elements (not shown) for connecting switches 308 to controller 210 via switch body 312 or separately. As shown in FIGS. 3-5, the control element 102 is disposed in the housing 104 of a communication device 100 so that the primary actuator 302 at least partially projects outward therefrom, defining distal surface portions 302a and lateral surface portions 302b. However, the various embodiments of the invention are not limited in this regard. For example, the primary actuator 302 can alternatively be recessed with respect to an adjacent outermost surface 301 of the housing 104.

In the embodiment illustrated in FIGS. 3-5, the primary actuator 302 has a generally cylindrical form and extends along a central axis 360. In some embodiments, the primary actuator 302 can have a form that deviates somewhat from a conventional cylindrical shape. Thus, for example, the primary actuator 302 can have convex or concave sides. Also, the surface of the primary actuator 302 can be smooth or knurled.

The primary actuator 302 is configured to engage a first end of actuating member 304, while the second end of actuating member 304 is configured to engage or interface with switch body 312. According to one embodiment, actuating member 304 can be guided within a channel (not shown in FIGS. 3-5) formed in surface 301 of housing 104. The primary actuator 302 is further configured for transferring a rotational force applied thereto to actuating member 304. The transferred rotational force causes actuating member 304 to move (i.e., rotate about axis 360) and transition switch body 312 between the plurality of switch positions. By transitioning through the switch positions, the switch body 312 can provide signals for controlling a selected function of the communication device 100.

In the various embodiments of the invention, a suitable sensing means can be provided for the detection of a change of switch positions of the switch body 312. The sensing means can detect a rate of motion and/or an amount of motion by communicating sensor information to the controller 210. The sensing means can be a mechanical sensing means (not shown), an electrical sensing means (not shown), an electromechanical sensing means (not shown), or an electro-optical sensing means (shown in FIG. 3). For example, in one embodiment, member 304 and switch body 312 can be configured to provide a mechanical rotary switch. In another embodiment of the invention, actuating member 304 has a plurality of scan lines 334 formed on one or more ends thereof. The switch body 312 can then include optical position detector(s) configured for scanning the scan lines to determine the occurrence of rotation from the rest position (shown in FIG. 3). The information is provided to controller 210 to evaluate the amount and/or rate of rotation. Thereafter, the communication device 100 performs operations to change an operational parameter of the communication device 100 based on the amount and/or rate of button rotation. It should be noted that there are many known techniques for measuring and/or detecting motion of elements in a switch, and any such technique can be used herein without limitation.

In the embodiment illustrated in FIGS. 3-5, the control element 102 also comprises a pressure sensor 314 that is operable via an activation force ($F_{ACT}$) applied at portions of the lateral surface portions 302b of primary actuator 302. Specifically, the embodiment illustrated in FIGS. 3-5 includes secondary actuators 306 disposed on lateral surface portions 302b and switches 308 disposed within primary actuator 302. In this embodiment, the secondary actuators 306 can be transitioned from the rest position shown in FIG. 5 to an actuated position (shown by dotted lines in FIG. 5) for controlling a particular function of the communication device. The position transition can be achieved by depressing exposed portions of secondary actuators 306 for a short period of time (e.g., less than two seconds) or a long period of time (e.g., greater than two seconds). As a result of the depression of the secondary actuators 306, the switches 308 are placed in a closed or open position so as to indicate that the secondary actuators 306 are in an actuated position. The status of switches 308 can then be monitored via wiring elements that can be communicatively coupled to controller 210 of communications device 200. In some embodiments, the controller 210 performs operations to: (a) track the amount of time the switches 308 are activated (i.e., the amount of time secondary actuators 306 are depressed); and (b) change an operational parameter of the communication device 100 based on the duration of the depression.

In the various embodiments of the invention, the secondary actuators 306 are also configured to be transitioned from the rest position shown in FIG. 3 to the actuated position (activating switches 308) during motion of primary actuator 302 or for one or more periods of time prior to motion of primary actuator 302. Accordingly, in the various embodiments of the invention, multiple functions of the communications device 100 can be controlled via detection of the state of pressure sensor 314 and the position and/or motion of control element 102. For example, a first function of the communications device 100 can be controlled in response to a motion of the primary actuator 302 in the absence of activation of pressure sensor 314. A second function of the communications device 100 can be controlled in response to the motion of primary actuator 302 in combination with activation of pressure sensor 314. In addition to monitoring the state of the pressure sensor 314 during motion of the primary actuator 302, the state of the pressure sensor 314 prior to motion of the primary actuator 302 can also be monitored and used to determine the function to be controlled. For example, different functions of the communications device 100 can be controlled in response to motion of the primary actuator 302 following an activation of a pressure sensor 314 for different period of times. Alternatively, different functions of the communications device 100 can be controlled in response to motion of the primary actuator 302 following different numbers of activations of pressure sensor 314 during a period of time. Further, functions of the communications device 100 can be controlled via activation of the pressure sensor 314 without motion of the primary actuator 302.

In the embodiment illustrated in FIGS. 3-5, the pressure sensor 314 is implemented via two secondary actuators 306 activating a pair of switches 308. Furthermore, to provide a signal that the pressure sensor 314 is being activated in the embodiment illustrated in FIGS. 3-5, both switches 308 need to be activated at the same time. However, the various embodiments of the invention are not limited in this regard. In some embodiments, a single secondary actuator and switch can be provided for pressure sensor 314. Alternative, activation of a single one of switches 308 can also be used to indicate activation of pressure sensor. However, use of a dual actuator/switch configuration is typically useful to prevent inadvertent selection of a function. Rather, since the configuration in FIGS. 3-5 requires coordinated activation of switches 308, the likelihood of inadvertently activating an additional function is significantly reduced.

According to embodiments of the present invention, various functions of the communication device 100 are controlled in response to three (3) basic actions of a user. These three (3) basis actions include: the action of turning the primary actuator 302; the action of squeezing or depressing the secondary actuators 306; and the action of turning of the primary actuator 302 while concurrently squeezing or depressing the secondary actuators 306. Embodiments of the present invention are not limited in this regard.

As described above, various combinations of activations of pressure sensor 314 can be combined with motion of the primary actuator 302 to control a variety of functions of the communication device 100. For example, in some embodiments of the invention, the communications device 100 can be an LMR device or other wireless communications device. In conventional LMR devices, as described above, the user is typically required to use two hands and/or operate two or more controls of the LMR device to access one function. However, in various circumstances, such a configuration can be undesirable or impractical. For example, in some instances, one of the user's hands may be occupied by other tasks. In another example, the operation of the multiple controls may require additional time and/or concentration on the part of the user, thus requiring the user to divert his attention from the task at hand, possibly endangering the user or persons being attended to by the user. Accordingly, in the various embodiments of the invention, the combinations of activation of pressure sensor 314 and motion of the primary actuator 302 combination can be selected to provide users a more intuitive set of combinations for controlling communications device 100.

For example, in one embodiment of the invention, a simple set of user actions can be selected to control multiple functions. For example, an LMR device typically includes at least a channel/group select function, a volume adjustment function, and a PTT function. Thus, in one embodiment of the invention, a control element 102 can be configured to control functions of the LMR device as described below. A channel/group select function can be controlled by motion of the primary actuator 302 without activation of the pressure sensor 314. In contrast, a volume adjustment function can be controlled by motion of the primary actuator 302 with concurrent activation of the pressure sensor 314. Finally, a PTT call to the selected group can be initiated by activation of the pressure sensor 314 without motion of the primary actuator 302. In some configurations, adjustment of volume during a PTT call can be performed by subsequent, concurrent motion of the primary actuator 302. Thus, an intuitive interface is provided in which adjustment of group/channels is always associated with motion of the primary actuator 302 alone, volume adjustment is always associated with motion of the primary actuator 302 and activation of pressure sensor 314, and PTT calls are always initiated by activation of the pressure sensor 314 alone. However, the various embodiments of the invention are not limited to the configuration of functions and user actions described above.

In some embodiments, the configuration described above can be expanded to include detection of other basic user actions to provide control of additional functions. For example, an additional function can be controlled or initiated by two (or more) activations of the pressure sensor 314 and no subsequent motion of the primary actuator 302 within a time period. In another example, an additional function can be controlled or initiated by two (or more) activations of the pressure sensor 314 followed by subsequent motion of the primary actuator 302 within a time period.

Additionally, the various embodiments of the invention are not limited to solely control of LMR and other two-way communications devices. For example, in other embodiments of the present invention, the control element 102 can be disposed in other types of devices, such as a television (not shown in FIGS. 1-5) or a television remote controller (not shown in FIGS. 1-5). In this scenario, an audio volume function, a channel selection function, a power toggle function can be controlled by a control element 102 in response to combinations of activation of pressure sensor 314 and motion of primary actuator 302. For example, a channel select function can be controlled by motion of the primary actuator 302 without activation of the pressure sensor 314. In contrast, a volume adjustment function can be controlled by motion of the primary actuator 302 with concurrent activation of the pressure sensor 314. Finally, a power for the television can be toggled by activation of the pressure sensor 314 without motion of the primary actuator 302. Thus, an intuitive interface is provided in which selection of channels is always associated with motion of the primary actuator 302 alone, volume adjustment is always associated with motion of the primary actuator 302 and activation of pressure sensor 314, and toggling power is always initiated by activation of the pressure sensor 314 alone. However, the various embodiments of the invention are not limited to the configuration of functions and user actions described above.

Further, the configuration described above can be expanded to include detection of other basic user actions to provide control of additional functions. For example, an additional function can be controlled or initiated by two (or more) activations of the pressure sensor 314 and no subsequent motion of the primary actuator 302 within a time period. In another example, an additional function can be controlled or initiated by two (or more) activations of the pressure sensor 314 followed by subsequent motion of the primary actuator 302 within a time period.

Figure 6:
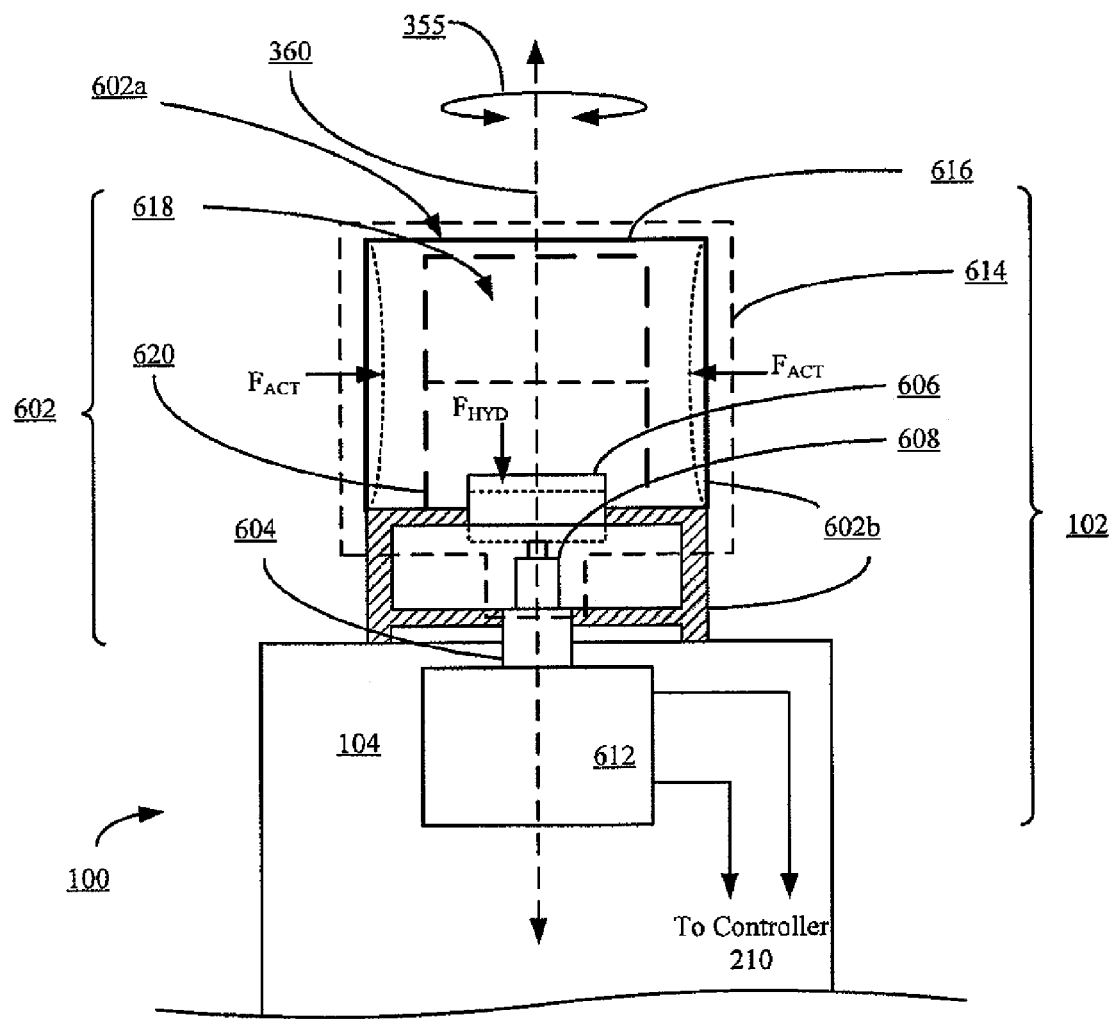
FIG. 6 is a cross-section side view of a portion of communications device 100 including a second exemplary embodiment of a control element in accordance with an embodiment of the invention.

In the embodiment illustrated in FIGS. 3-5, the various components of control element 102 are based on mechanical actuation. That is, a user directly actuates secondary actuators 306 with an activation force ($F_{ACT}$) to cause motion thereof and activate switches 308. However, the various embodiments of the invention are not limited in this regard. For example, in some embodiments of the invention, at least some of the components of control element 102 can be based on hydraulic actuation. Such a configuration is shown in FIG. 6. FIG. 6 is cross-section view of a portion of communications device 100 including a second exemplary embodiment of control element 602. The view of FIG. 6 is taken along a section line of communications device 100 similar to section line 5-5 in FIG. 3.

In the exemplary embodiment illustrated in FIG. 6, the control element 602 is also based on rotary motion (i.e., the control element 602 is a rotary switch). However, it should be understood that there are numerous ways of implementing the embodiment of control element 602 in FIG. 6. As such, the invention is not limited to the specific arrangement shown in FIG. 6.

As shown in FIG. 6, the control element 602 includes an primary actuator 602, an actuating member 604 (e.g., a shaft or lever), secondary actuator 606, switch 608, and a switch body 612 having a plurality of switch positions, similar to the configuration of control element 102 in FIGS. 3-5. Control element 602 can also include wiring elements (not shown) for connecting switches 608 to controller 210 via switch body 612 or separately. Thus the description above for components 302-312 in FIGS. 3-5 is sufficient for describing the general configuration and operation of components 602-612 in FIG. 6. However, a significant difference between the configuration of FIGS. 3-5 and the configuration of FIG. 6 is that the upper portion of primary actuator 602 in FIG. 6 comprises a hydraulic actuator 616, filled with a fluid 618, attached to primary actuator 602 and disposed over secondary actuator 306. In operation, when an activation force ($F_{ACT}$) is applied to lateral surface portions 602b associated with hydraulic actuator 616, the pressure on the hydraulic actuator 616 causes it to deforms inward, as shown in FIG. 6. The deformation of hydraulic actuation 616 causes fluid 618 to apply a hydraulic force ($F_{HYD}$) against secondary actuator 606. The resulting force on secondary actuator 606 can cause its motion, as shown in FIG. 6, and thus activate switch 608. Thus, a pressure sensor 614 in FIG. 6 not only includes secondary actuator 606 and switch 608, but also includes hydraulic actuator 616 and fluid 618.

In general, some types of deformable components can become damaged due to fatigue from a large number of deformations over an extended period of time. This process can be accelerated by environmental conditions. In some embodiments of the invention, the amount of deformation of hydraulic actuator 616 can be controlled in several ways. For example, the dimensions and materials used for forming hydraulic actuator 616 can be selected such that the amount of deformation is limited for a range of external forces applied thereto. In other embodiments, a substantially rigid frame 620 can be formed within hydraulic actuator 616 to limit the amount of deformation for a range of external forces applied thereto. However, the various embodiments of the invention are not limited in this regard and other methods for limiting deformation are equally applicable.

In the various embodiments of the invention, the configuration of control element 602 in FIG. 6 can also be selected to facilitate operation of the control element 602 during user actions requiring concurrent activation of pressure sensor 614 and motion of primary actuator 602. In the configuration of FIG. 6, a user would typically apply both the external pressure for deforming the hydraulic actuator 616 and the force for changing a position of primary actuator 602 on the hydraulic actuator 618 portion of control element 602. Therefore, in the case of a rotary switch configuration of control element 602, such as in FIG. 6, the materials and construction for hydraulic actuator 616 are selected such that the hydraulic actuator is sufficiently stiff to transfer most, if not all, the rotational force applied thereto to the primary actuator 602. For example, in some embodiments, the materials comprising hydraulic actuator 616 and their arrangement therein can be selected so that the resulting actuator preferably deforms in only a radial direction. In other embodiments, a substantially rigid frame 620 can be formed within hydraulic actuator 616 to transfer the force to primary actuator 602. However, the various embodiments of the invention are not limited in this regard and other methods for limiting the deformation of hydraulic actuator 616 during adjustment of the primary actuator 602 are equally applicable.

Similarly, in the case of control element based on linear, pivoting, or other types of motion, the materials and construction in a hydraulic actuator therein can selected such that the hydraulic actuator is sufficiently stiff to transfer most, if not all, force to the primary actuator of such a control element.

Figure 7:
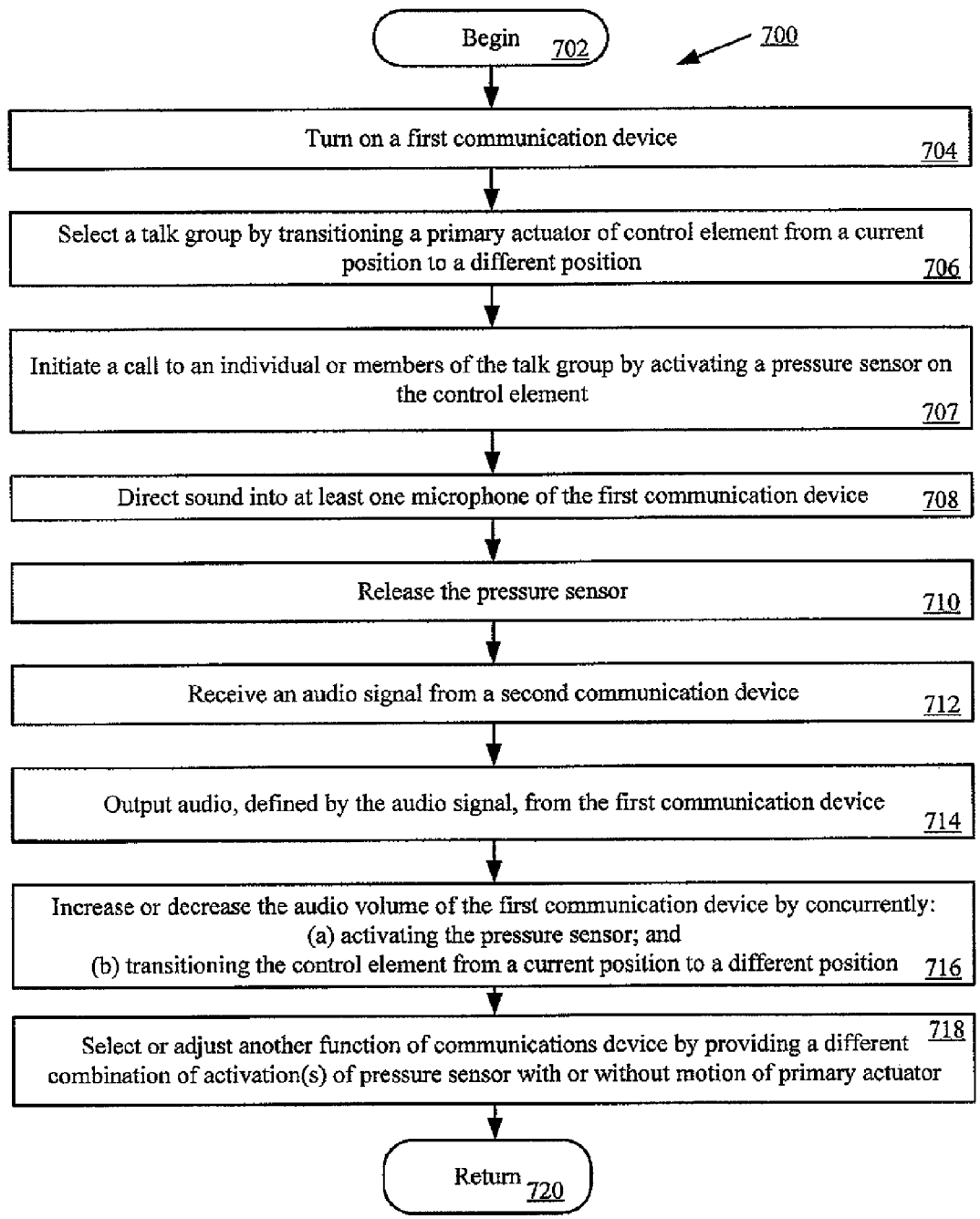
FIG. 7 is a flow diagram of an exemplary method for controlling a radio transceiver of a communication device that is useful for understanding the invention.

Referring now to FIG. 7, there is provided a flow diagram of an exemplary method 700 for controlling a radio transceiver of a communication device (e.g., the communication device 100 of FIG. 1) in accordance with an embodiment of the invention. As shown in FIG. 7, the method 700 begins with step 702 and continues with step 704 where the communication device (e.g., communication device 100 of FIG. 1) is turned on.

In a next step 706, a talk group can be selected by actuating a control element (e.g., the control element 102 of FIG. 1) without activating a pressure sensor disposed thereon (e.g., primary actuator 302 of control element 102 in FIGS. 3-5). For example, the talk group can be selected by transitioning the control element, via a primary actuator (e.g., primary actuator 302 of control element 102 in FIGS. 3-5) from its current position to a different position associated with a desired talk group. In some embodiments of the invention, the communications device can be configured to generate audio and/or visual indicia to notify users of their talk group selection.

Once the talk group is selected at step 706, the method 700 continues with step 707 where a call is initiated to an individual or members of the selected talk group. In one embodiment of the invention, the call initiation can be accomplished by activating the pressure sensor on the control element for a period of time (e.g., 2 seconds or more) without any transitioning of the control element between switch positions. After initiating the call, step 708 is performed where the user of the communication device (e.g., communication device 100 of FIG. 1) directs sound, such as speech, into one or more microphones thereof. The communication device (e.g., communication device 100 of FIG. 1) then processes the sounds to generate audio signals. The audio signals are then communicated from the communication device (e.g., communication device 100 of FIG. 1) to one or more other communication devices via a network. The communication devices can be members of the selected talk group.

In a next step 710, the user of the communication device (e.g., communication device 100 of FIG. 1) releases the pressure sensor on the control element. In some embodiments, the call can be immediately terminated. In other embodiments, the call can remain open until the call is terminated by expiration of one or more call timers or when the call is closed by the call initiator or one of the call members. After the pressure sensor is released at step 710, the communication device (e.g., communication device 100 of FIG. 1), can receive an audio signals, such as speech, from a second communication device in step 712. Thereafter, step 714 is performed where audio is output from the communication device (e.g., communication device 100 of FIG. 1) based on the audio signals received in the previous step 712.

If an audio volume adjustment is needed, an audio volume can be increased or decreased at step 716 by activating the pressure sensor on the control element and concurrently transitioning the control element from a current position to different position. Further, if selection or adjustment of another function is also needed, such selection or adjustment can be performed at step 718 by providing another combination of activation(s) of the pressure sensor of control element with or without motion of the primary actuator. Subsequent to completing step 718, step 720 is performed where the method 700 returns to step 702 or other processing is performed by the communication device (e.g., communication device 100 of FIG. 1).

As evident from the above discussion, the invention provides communication devices with certain advantages over conventional communication devices. For example, a plurality of actions or functions of a communication device can be selected or controlled using the single control element of the invention. In effect, a user only needs one hand to change functional settings thereof through the single control element of the invention. Further, the control elements of the invention advantageously facilitate the decrease in overall sizes of communication devices. The relatively small sized communication devices of the invention are less expensive to manufacture as compared to conventional communication devices including a plurality of rotary knobs and buttons for controlling functions thereof.

All of the apparatus, methods and algorithms disclosed and claimed herein can be made and executed without undue experimentation in light of the present disclosure. While the invention has been described in terms of preferred embodiments, it will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope and concept of the invention as defined.

We claim:

1. A method for controlling multiple functions of an electronic device using a single control element comprising a switch body having a plurality of switch positions, a primary actuator extending from said switch body with lateral and distal surface portions and configured for adjusting the switch body between the plurality of switch positions, and a pressure sensor operable via an activation force at one or more portions of said lateral surfaces of said primary actuator, the method comprising:

controlling a first function of said electronic device in response to motion of said primary actuator about a rotation axis in conjunction with a concurrent activation of said pressure sensor;

controlling a second function of said electronic device in response to said motion of said primary actuator exclusive of said activation of said pressure sensor; and controlling a third function of said electronic device in response to said activation of said pressure sensor exclusive of motion of said primary actuator; and wherein said activation of said pressure sensor further comprises temporarily deforming said lateral surface portions of said primary actuator as a result of said activation force.

2. The method of claim 1, further comprising:
controlling a fourth function of said electronic device in response to said motion of said primary actuator following said activation of said pressure sensor.

3. The method of claim 2, further comprising:
controlling a fifth function of said electronic device in response to said motion of said primary actuator following said activation of said pressure sensor for a third period of time that is longer than said second period of time.

4. The method of claim 1, further comprising:
controlling a fourth function of said electronic device in response to said motion of said primary actuator following at least two activations of said pressure sensor during a second period of time.

5. The method of claim 1, further comprising changing an operational parameter of said electronic device based on said motion of said primary actuator.

6. The method of claim 5, wherein said operational parameter is selected from the group consisting of a talk group parameter and an audio volume parameter.

7. The method according to claim 1, further comprising selecting at least one of said first, second, and third functions from the group consisting of an audio volume function, a channel selection function, a mute function, a brightness selection function, an "on/off" function, a play function, a rewind function, a fast forward function, a pause function, a channel recall function, a camera function, a talk group selection function, a media profile selection function, an individual call function, a group call function, an emergency call function, a map selection function, a priority selection function, a user interface selection function and a Push To Talk function.

8. An electronic device, comprising:
a control element comprising a switch body adjustable between a plurality of switch positions, a primary actuator with lateral and distal surface portions extending from said switch body and configured for adjusting the switch body between the plurality of switch positions, and a pressure sensor operable via a deformation of said lateral surface portions responsive an activation force at one or more portions of said lateral surfaces of said primary actuator; and at least one controller communicatively coupled to said control element and configured to:
(a) control a first function of said electronic device in response to motion of said primary actuator about a rotation axis during an activation of said pressure sensor,
(b) control a second function of said electronic device in response to said motion of a primary actuator of the control element exclusive of said activation of said pressure sensor, and
(c) control a third function of said electronic device in response to said activation of said pressure sensor for at least a first period of time exclusive of motion of said primary actuator.

9. The electronic device of claim 8, wherein said controller is further configured to control a fourth function of said electronic device in response to said motion of said primary actuator following said activation of said pressure sensor for a second period of time.

10. The electronic device of claim 9, wherein said controller is further configured to control a fifth function of said electronic device in response to said motion of said primary actuator following said activation of said pressure sensor for a third period of time that is longer than said second period of time.

11. The electronic device of claim 8, wherein said controlled is further configured to control a fourth function of said electronic device in response to said motion of said primary actuator following at least two activations of said pressure sensor during a second period of time.

12. The electronic device of claim 8, wherein said controller is further configured to change an operational parameter of said electronic device based on said motion of said primary actuator.

13. The electronic device of claim 12, wherein said operational parameter is selected from the group consisting of a talk group parameter and an audio volume parameter.

14. The electronic device of claim 12, wherein at least one of said first, second, and third functions is selected from the group consisting of an audio volume function, a channel selection function, a mute function, a brightness selection function, an "on/off" function, a play function, a rewind function, a fast forward function, a pause function, a channel recall function, a camera function, a talk group selection function, a media profile selection function, an individual call function, a group call function, an emergency call function, a map selection function, a priority selection function, a user interface selection function and a PTT function.

15. The electronic device of claim 8, wherein said pressure sensor comprises at least one secondary actuator and at least one switch selectively activated via motion of said secondary actuator.

16. The electronic device of claim 15, wherein said pressure sensor further comprises a hydraulic actuator disposed over said secondary actuator, said hydraulic actuator comprising a deformable fluid filled enclosure configured for transforming a force externally applied to said hydraulic actuator to a hydraulic force for causing said motion of said secondary actuator.

17. The electronic device of claim 16, wherein said hydraulic actuator is substantially rigid in at least a direction of said motion of said primary actuator.

18. An electronic device, comprising:
a control element comprising a switch body adjustable between a plurality of switch positions, a primary actuator with lateral and distal surface portions extending from said switch body and configured for adjusting the switch body between the plurality of switch positions, and a pressure sensor operable via an activation force at one or more portions of said lateral surfaces of said primary actuator; and
at least one controller communicatively coupled to said control element and configured to:
(a) control a first function of said electronic device in response to motion of said primary actuator during an activation of said pressure sensor,
(b) control a second function of said electronic device in response to said motion of a primary actuator of the control element exclusive of said activation of said pressure sensor, and
(c) control a third function of said electronic device in response to said activation of said pressure sensor for at least a first period of time exclusive of motion of said primary actuator;
wherein said pressure sensor comprises at least one secondary actuator and at least one switch selectively activated via motion of said secondary actuator;
wherein said pressure sensor further comprises a hydraulic actuator disposed over said secondary actuator, said hydraulic actuator comprising a deformable fluid filled enclosure configured for transforming a force externally applied to said hydraulic actuator to a hydraulic force for causing said motion of said secondary actuator; and
wherein said pressure sensor further comprises a substantially rigid frame coupled to said primary actuator and at least partially extending through said hydraulic actuator.

19. The electronic device of claim 8, wherein the control element comprises a rotary switch element, and wherein said actuator comprises a knob assembly for said rotary switch element.

20. A radio transceiver, comprising:
one or more radio frequency circuits;
a control element comprising a rotary switch body movable between a plurality of switch positions, a primary actuator with lateral and distal surface portions extending from said switch body and configured for moving the switch body between the plurality of switch positions, and a pressure sensor responsive to a deformation of said lateral surfaces of said primary actuator; and
at least one controller communicatively coupled to said control element and said radio frequency circuits, wherein the controller is configured to:
(a) control a first function of said radio transceiver in response to motion of said primary actuator about a rotation axis during an activation of said pressure sensor,
(b) control a second function of said radio transceiver in response to said motion of a primary actuator of the control element exclusive of said activation of said pressure sensor, and
(c) activate a Push to Talk (PTT) function of said radio transceiver in response to said activation of said pressure sensor for at least a first period of time exclusive of motion of said primary actuator.

21. The radio transceiver of claim 20, wherein said controller is further configured to change an operational parameter of said radio transceiver based on said motion of said primary actuator.

22. The radio transceiver of claim 21, wherein said operational parameter is selected from the group consisting of a talk group parameter and an audio volume parameter.

23. The radio transceiver of claim 20, wherein said pressure sensor comprises at least one secondary actuator and at least one switch selectively activated via motion of said secondary actuator.

24. The radio transceiver of claim 23, wherein said pressure sensor further comprises a hydraulic actuator disposed over said secondary actuator, said hydraulic actuator comprising a deformable fluid filled enclosure configured for transforming a force externally applied to said hydraulic actuator to a hydraulic force for causing said motion of said secondary actuator.

25. The radio transceiver of claim 24, wherein said hydraulic actuator is substantially rigid in at least a direction of said motion of said primary actuator.

26. A radio transceiver, comprising:
one or more radio frequency circuits;
a control element comprising a rotary switch body movable between a plurality of switch positions, a primary actuator with lateral and distal surface portions extending from said switch body and configured for moving the switch body between the plurality of switch positions, and a pressure sensor accessible at said lateral surfaces of said primary actuator; and
at least one controller communicatively coupled to said control element and said radio frequency circuits, wherein the controller is configured to:
(a) control a first function of said radio transceiver in response to motion of said primary actuator during an activation of said pressure sensor,
(b) control a second function of said radio transceiver in response to said motion of a primary actuator of the control element exclusive of said activation of said pressure sensor, and
(c) activate a Push to Talk (PTT) function of said radio transceiver in response to said activation of said pressure sensor for at least a first period of time exclusive of motion of said primary actuator;
wherein said pressure sensor comprises at least one secondary actuator and at least one switch selectively activated via motion of said secondary actuator; and
wherein said pressure sensor further comprises a hydraulic actuator disposed over said secondary actuator, said hydraulic actuator comprising a deformable fluid filled enclosure configured for transforming a force externally applied to said hydraulic actuator to a hydraulic force for causing said motion of said secondary actuator;
wherein said pressure sensor further comprises a substantially rigid frame coupled to said primary actuator and at least partially extending through said hydraulic actuator.

* * * * *